United States Patent [19]

Kaufmann

[11] 4,106,860
[45] Aug. 15, 1978

[54] LIQUID-CRYSTAL CELL

[75] Inventor: Meinolph Kaufmann, Niederwil, Switzerland

[73] Assignee: BBC Brown Boveri & Company Limited, Baden, Switzerland

[21] Appl. No.: 737,779

[22] Filed: Nov. 1, 1976

Related U.S. Application Data

[63] Continuation of Ser. No. 503,169, Sep. 3, 1974, abandoned.

[30] Foreign Application Priority Data

Sep. 7, 1973 [CH] Switzerland .............. 12865/73

[51] Int. Cl.² .................................................. G02F 1/13
[52] U.S. Cl. ............................. 350/343; 228/121; 228/263
[58] Field of Search ............... 228/121, 263; 357/71; 350/160 LC

[56] References Cited

U.S. PATENT DOCUMENTS

| 3,409,809 | 11/1968 | Diehl | 357/71 |
|---|---|---|---|
| 3,633,076 | 1/1972 | Arndt et al. | 357/71 |
| 3,751,137 | 8/1973 | Fitzgibbons et al. | 350/160 LC |
| 3,834,791 | 9/1974 | Raimbault | 350/160 LC |
| 3,932,024 | 1/1976 | Yaguchi et al. | 350/160 LC |

*Primary Examiner*—Edward S. Bauer
*Attorney, Agent, or Firm*—Oblon, Fisher, Spivak, McClelland & Maier

[57] ABSTRACT

A liquid crystal cell, the liquid-crystal substance of which is contained between two cell plates coated on their inner sides with electrodes, separated from each other by spacing elements and hermetically sealed by sealing material, the electrodes of the two cell plates being connected to each other by means of electrically conducting material, in which the bonded inserts serving as spacing elements are so arranged that between the cell plates there is a hole for introducing the liquid-crystal substance, and that on the edge surface of each cell plate in the region of this hole there is provided at least one conducting film which extends over the edges of the cell plates to the electrodes to be connected and is in electrical contact with these electrodes, and further that in this region there is provided a solderable metal coating extending from one cell plate across the bonded insert to the other cell plate, a conductive sealing substance being applied to this coating in order to seal the hole hermetically.

2 Claims, 5 Drawing Figures

LIQUID-CRYSTAL CELL

This is a continuation of application Ser. No. 503,169, filed Sep. 3, 1974, now abandoned.

BACKGROUND OF THE INVENTION

1. Field of the Invention

The invention relates generally to a liquid-crystal cell and more particularly to a liquid crystal cell wherein the liquid-crystal substance is contained between two cell plates coated on their inner side with electrodes, separated from each other by spacing elements and hermetically sealed by sealing material, the electrodes of the two cell plates being partly connected to each other by means of electrically conducting material, and a method for manufacturing such a liquid-crystal cell.

2. Description of the Prior Art

In a liquid-crystal cell intended to serve as a display device, the layer of liquid crystal is contained between two transparent cell plates provided with defined electrode structures. The design arrangement is usually of such a kind that the conducting parts on one of the two electrode surfaces are connected in groups or all together, and therefore, have only a few connections, there often being only one common electrical connection. The other, opposite electrode surface in the case of digital displays, for example, is divided into segments so that the segments of each numeral can be activated individually.

In order to facilitate the contact layout between display circuits and control circuits, it is desirable to have all the contacts in a single plane. An effective way of doing this is to lead the relatively few electrode connections of one electrode surface across to the other, highly segmented electrode surface. For this, the gap between the two electrode-coated cell plates, which corresponds to the thickness of the liquid-crystal layer, must be bridged electrically.

Various methods of creating electrical contact bridges of the kind described have already been proposed. Thus a method is known from German patent application DOS No. 2,058,104 published May 31, 1972 whereby metal wires (e.g. gold wire) are clamped between the electrodes at suitable points to serve both as electrical bridges and also as spacing elements. Another method is described in German patent application DOS No. 2,201,267 published July 26, 1973. Here, local inductive heating is employed to join a metal film to the similarly softened support plate. According to German patent application DT-OS No. 2,240,781 published Feb. 22, 1973, the necessary contact is achieved by joining together electrically some of the electrodes of the opposing plates outside the cell cavity containing the liquid-crystal substance.

SUMMARY OF THE INVENTION

One object of the present invention is to provide a liquid-crystal cell of which the bridging contacts, when required, serve at the same time as a means of closing off a filling hole, which with certain liquid-crystal cells has to be provided so that the liquid crystal substance can be introduced after the cell plates have been joined together by means of a bonded insert, as otherwise the bonding process would destroy the liquid-crystal substance.

Briefly, in accordance with one embodiment of this invention, the above and other objects are attained in that the bonded inserts serving as spacing elements are so arranged that between the cell plates there is a hole for introducing the liquid-crystal substance, and that on the edge surface of each cell plate in the region of this hole there is provided at least one conducting film which extends over the edges of the cell plates to the electrodes to be connected and is in electrical contact with these electrodes, and further that in this region there is provided a solderable metal coating extending from one cell plate across the bonded insert to the other cell plate, a conductive sealing substance being applied to this coating in order to seal the hole hermetically.

A liquid-crystal cell of this kind can be manufactured in that before assembly at least one conductive coating extending from the electrodes on the edge surfaces of the cell plates is vapor deposited on each of the cell plates provided with electrodes, the cell plates being provided with a bonded insert in such a manner that a hole remains in the region of the vapor deposited coatings, and that a solderable metal coating is applied to the bonded cell plates in the region of the hole by means of a multi-stage high vacuum vapor deposition process, the hole being sealed with a solderable conducting substance after the liquid-crystal substance has been introduced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3b is a section through a liquid-crystal cell in the region of the hole along the line A-B shown in FIG. 3a; and FIG. 4 is a section through a filled and sealed liquid-crystal cell along the line A-B shown in FIG. 3a.

DETAILED DESCRIPTION OF THE PREFERRED EMBODIMENT

Figure 1:
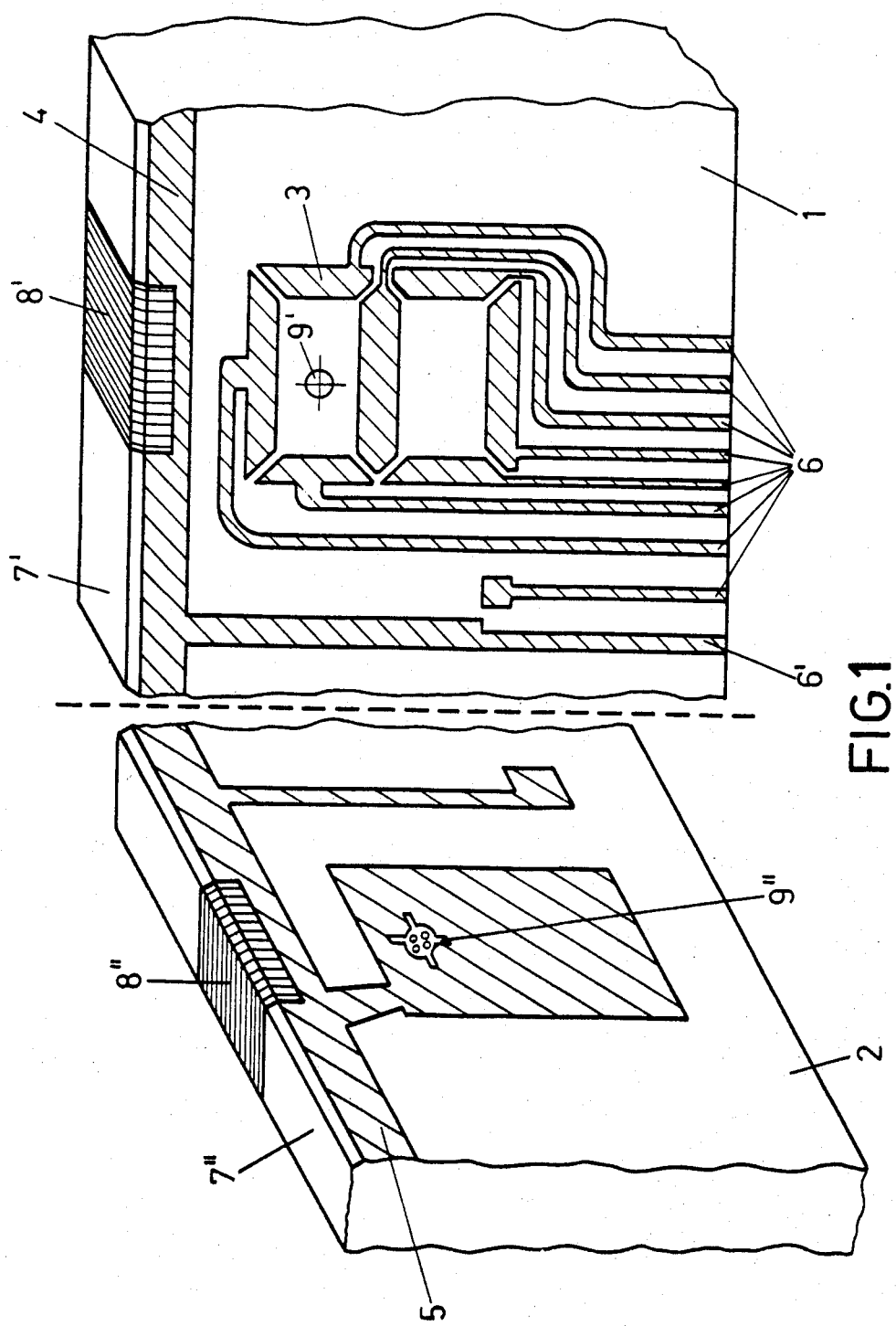
FIG. 1 shows a perspective view with parts broken away of two cell plates, of which the electrode-coated surfaces shown are to face each other.

Referring now to the drawings wherein like reference characters designate identical or corresponding parts throughout the several views, and more particularly to FIG. 1, wherein the reference numbers 1, 2 denote cell plates of glass on which are located electrodes 3, 4, 5 and alignment marks 9', 9''. The electrode 3 is divided into segments for the digital display and, in addition to the eight connections 6 provided for this purpose, has another connection denoted 6' for a contact electrode strip 4 located along the side. The electrode 5 consists of electrically connected parts. Metallic contact films 8', 8'' are located on the edge surfaces 7', 7'' of the cell plates 1 and 2.

Figure 2:
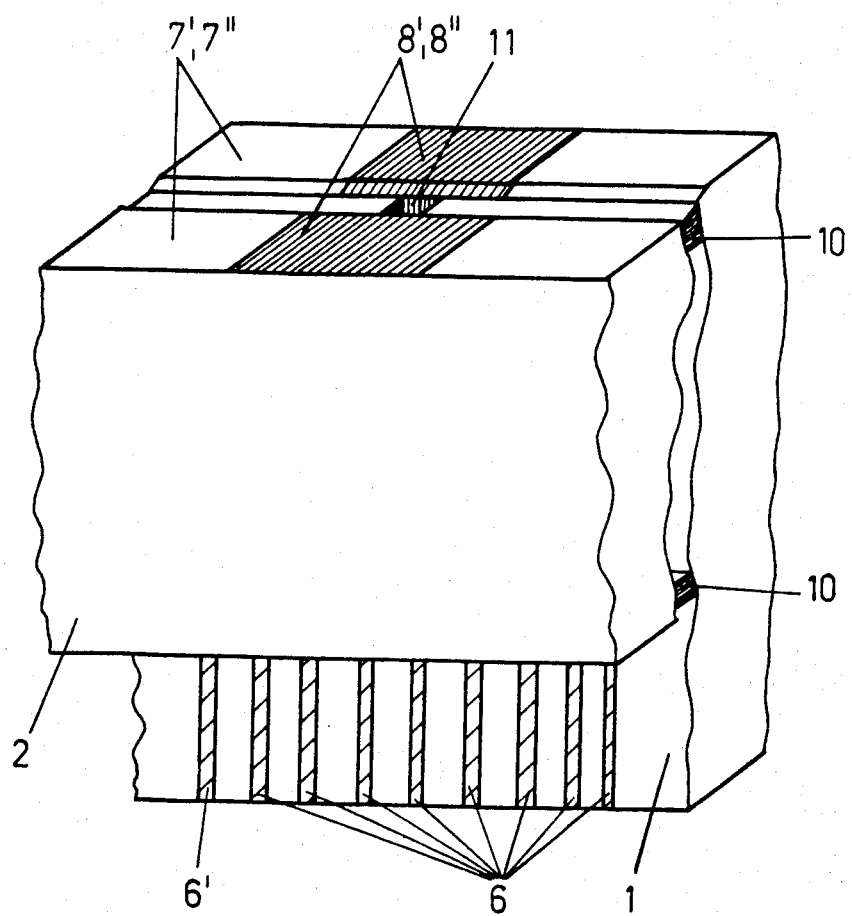
FIG. 2 is a perspective view of part of a liquid-crystal cell after fitting the glass-bonded insert (the electrodes visible through the transparent cell surface are not shown)

As shown in FIG. 2, a glass-bonded insert 10 is provided, which, together with the cell plates 1, 2, forms a hole 11.

Figure 3A:
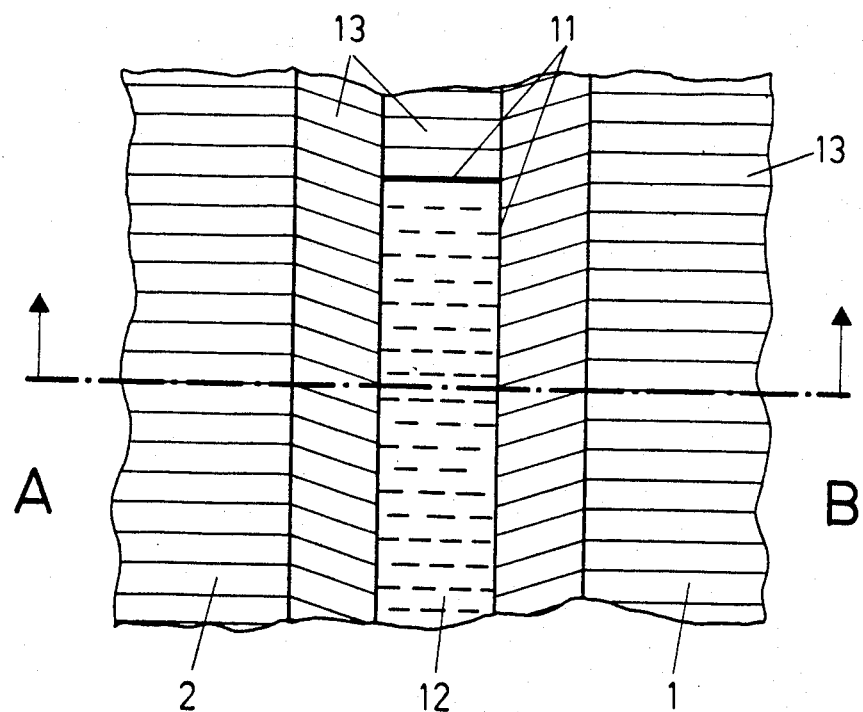
FIG. 3a shows a plan view of a filled liquid-crystal cell in the region of the hole.
Figure 3B:
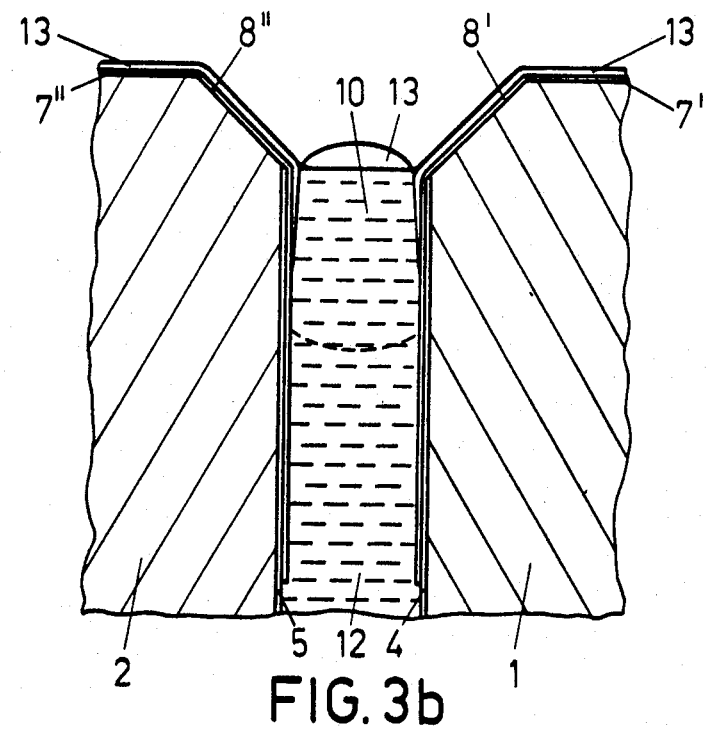

In FIGS. 3a and 3b it can be seen that the hole 11 is surrounded by a solderable coating 13, and that the inside of the cell is filled with the liquid-crystal substance 12.

Figure 4:
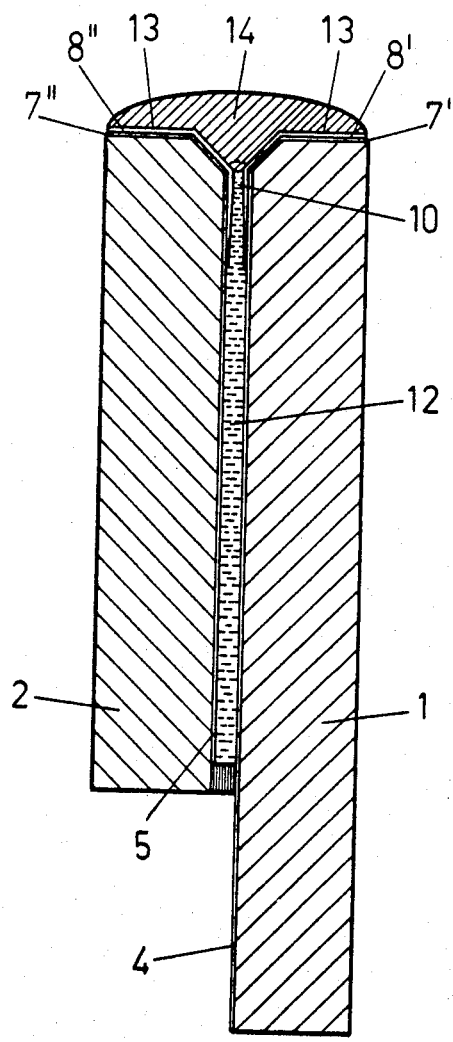

In FIG. 4, the hole 11 is shown to be sealed with soft solder 14.

When carrying out the method of the invention, the cell plates 1 and 2 provided with electrodes 3, 4 and 5 are placed together with a suitable metal template in a high vacuum vapor deposition device such that on completion of the vapor deposition process, they are provided with thin conducting contact films 8' and 8" so as to create good connections from electrodes 4 and 5 over the edges to the edge surfaces 7' and 7" of the cell plates 1 and 2. These contact films 8', 8" are preferably of aluminum. Most other non-noble metals are less suitable for the contact film as during the subsequent glass-bonding process they are subjected to temperatures of more than 400° C, and can thus oxidize or melt. Furthermore, most non-noble metals (apart from aluminum) adhere poorly to glass. With aluminum, however, an $Al_2O_3$ skin about $0.1\mu$ forms immediately; this protects the vapor deposited films 8' and 8" against oxidation, even at elevated temperatures, and provides an excellent electrical contact. Noble metals are also suitable for the contact film, but owing to the necessary film thickness of approximately $0.2\mu$ the production costs of the liquid-crystal cell are high when expensive noble metals are used.

The cell plates 1 and 2 provided with contact films 8', 8" are provided in the region near the edge with a glass-bonded insert 10 (FIG. 2) in such a way that a gap 11 approximately 12mm wide is left at the contact films 8', 8". After the glass bonding process, which takes about 1 hour at approximately 400° C, there results the liquid-crystal cell shown in part in FIG. 2, the only opening of which is the hole 11 bounded by contact films 8' and 8", and the glass-bonded insert 10. It is recommended that the glass-bonded insert 10 should be applied to the cell plates 1 and 2, by means of a screen printing process for example, to such a thickness that the two cell plates after the glass-bonding process are separated by a distance of between 5 and $20\mu$.

The glass bonded liquid-crystal cell is now masked and introduced into a high vacuum vapor deposition device so that a solderable metal coating 13 (FIG. 3) can be applied to the contact films 8' and 8" and glass-bonded insert 10 only in the region of the hole 11. This metal coating 13 preferably comprises a vapor deposited three layer structure of chromium/copper/gold or chromium/nickel/gold. The first metal deposited is chromium. This acts as an adhesive layer and therefore has a thickness of only approximately $0.03\mu$. The actual soldering layer is of copper or nickel, and is therefore 10 times as thick. A gold film about $0.03\mu$ thick is finally applied to provide a protective coating. This greatly improves the solderability of the metal coating 13. The combination chromium/nickel/gold is particularly to be recommended as nickel solders more easily to soft solder than does copper.

The glass-bonded liquid-crystal cell provided with a solderable metal coating 13 in the region of the hole 11 is then evacuated and filled with the liquid-crystal substance 12. Such a solderable liquid-crystal cell is shown filled in FIGS. 3a and 3b.

Following this, the liquid-crystal cell can be sealed by soldering either by hand with a soldering iron or mechanically by a dip-soldering process, without the need for previous cleaning. The surplus drop of liquid crystal can here be used as a flux. In addition to the tin-lead solders, e.g. 60% Zn, 40% Pb, one can also use special solders, such as tin-lead-silver, tin-lead-cadmium or alternatively alloys of indium. The latter have less effect on the solderable coatings 13 and reduce the thermal stress on the liquid-crystal substance 12. A hermetically sealed cell with bridging contacts is shown in FIG. 4.

The method described is best suited to glass-bonded cells in which the contact films 8', 8" are subjected to heavy thermal stresses. Thus, with this method the filling hole is hermetically sealed, despite inhomogeneities in the cell-plate surfaces, and dangerous mechanical stresses in the plates owing to high local temperature rises are avoided. The method described can, however, also be employed for liquid-crystal cells sealed with plastics. Since with this sealing technique there is no high thermal stress (maximum 100° - 200° C), the contact films 8' and 8" can immediately act as the solderable coating, using the three-stage high vacuum vapor deposited combination of chromium, nickel and gold.

Bridging-contact configurations can be provided simultaneously on one cell, both with glass-bonded and also plastics-sealed liquid-crystal cells, one of these soldered configurations acting as the site for hermetically sealing the cell.

The method can also be used when there is no filling hole to be sealed, but only bridging contacts are required. In the case of such bridging contacts, the contact films 8' and 8" which extend the electrical paths to the edge surfaces 7' and 7" can be connected by applying a drop of conductive epoxy material.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A liquid-crystal cell comprising:
   two glass cell plates coated on the inner surfaces thereof with electrodes and containing a liquid crystal substance therebetween,
   spacing elements separating said cell plates, and integrally bonded to said cell plates so as to hermetically seal said cell plates together,
   electrically conducting material connecting said electrodes of said cell plates,
   said spacing elements being so arranged with said cell plates that between said cell plates and said elements there is defined a hole for introducing said liquid-crystal substance,
   contact films formed of aluminum provided by vapor deposition on the end surfaces of each of said cell plates in the region of said hole, said contact films extending over said end surfaces of said cell plates to the inner surfaces thereof and contacting said electrodes for forming enlarged electrical contact surfaces whereby said electrodes may be reliably interconnected.
   a solderable metal coating of Cr-Cu-Au, or Cr-Ni-Au layers, disposed by vapor deposition over said contact films and said spacing elements extending from one of said cell plates across said spacing elements to the other of said cell plates so as to surround said hole, and
   a conductive sealing substance applied to said contact films across said end surfaces for sealing said hole hermetically and for electrically connecting said electrodes.

2. A liquid-crystal cell as set forth in claim 1, in which the conducting sealing substance comprises an alloy of tin/lead, tin/lead/silver, tin/lead/cadmium or alloys of indium.

* * * * *